US010500562B2

(12) United States Patent
Harris et al.

(10) Patent No.: US 10,500,562 B2
(45) Date of Patent: Dec. 10, 2019

(54) ZIRCONIA-BASED COMPOSITIONS FOR USE IN PASSIVE NOX ADSORBER DEVICES

(71) Applicants: Magnesium Elektron Limited, Manchester (GB); University of Kentucky Research Foundation, Lexington, KY (US)

(72) Inventors: Deborah Jayne Harris, Manchester (GB); David Alastair Scapens, Manchester (GB); John G. Darab, Flemington, NJ (US); Mark Crocker, Georgetown, KY (US); Yaying Ji, Lexington, KY (US)

(73) Assignees: Magnesium Elektron Ltd., Manchester (GB); University of Kentucky Research Foundation, Lexington, KY (US)

(*) Notice: Subject to any disclaimer, the term of this patent is extended or adjusted under 35 U.S.C. 154(b) by 0 days.

(21) Appl. No.: 15/945,770

(22) Filed: Apr. 5, 2018

(65) Prior Publication Data
US 2019/0308164 A1 Oct. 10, 2019

(51) Int. Cl.
*B01J 20/02* (2006.01)
*B01J 20/06* (2006.01)
*B01J 20/32* (2006.01)
*B01D 53/04* (2006.01)
*B01D 53/94* (2006.01)

(52) U.S. Cl.
CPC ............ *B01J 20/06* (2013.01); *B01D 53/04* (2013.01); *B01D 53/9418* (2013.01); *B01D 53/9481* (2013.01); *B01J 20/0225* (2013.01); *B01J 20/3204* (2013.01); *B01J 20/3214* (2013.01); *B01J 20/3236* (2013.01); *B01D 2253/1122* (2013.01); *B01D 2253/25* (2013.01); *B01D 2257/404* (2013.01)

(58) Field of Classification Search
CPC ............ B01D 53/9422; B01D 53/9427; B01D 53/9431; B01D 53/9481; B01D 2255/207; B01D 2255/40; B01D 2255/2255; B01D 2255/20715; B01D 2255/91; B01D 2257/402; B01D 2257/404; B01D 2258/012; B01D 2253/00; B01D 2253/10; B01D 2253/112; B01J 20/0207; B01J 20/0211; B01J 20/0225; B01J 21/066; F01N 3/0807; F01N 3/0814; F01N 3/0842; F01N 3/2066; F01N 3/2073; F01N 2240/18; F01N 2250/12; F01N 2570/14
See application file for complete search history.

(56) References Cited

U.S. PATENT DOCUMENTS

| 6,129,898 A * | 10/2000 | Watkins ............ B01D 53/9422 423/213.2 |
| 6,727,202 B2 * | 4/2004 | Deeba ................ B01D 53/9431 423/239.1 |
| 7,431,910 B2 | 10/2008 | Takao et al. |
| 7,632,477 B2 | 12/2009 | Takao et al. |
| 7,794,687 B2 | 9/2010 | Bradshaw et al. |
| 8,105,559 B2 | 1/2012 | Melville et al. |
| 8,920,756 B2 | 12/2014 | Koch et al. |
| 9,011,806 B2 | 4/2015 | Bisson et al. |
| 9,169,129 B2 | 10/2015 | Hernandez et al. |
| 9,687,811 B2 | 6/2017 | Biberger et al. |
| 10,189,010 B2 * | 1/2019 | Ifrah ..................... B01J 23/002 |
| 2007/0014710 A1 * | 1/2007 | Gerlach ............... B01D 53/945 423/213.5 |
| 2009/0191108 A1 * | 7/2009 | Blanchard .......... B01D 53/9422 423/239.1 |
| 2011/0118113 A1 * | 5/2011 | Miyoshi ............. B01D 53/9422 502/304 |
| 2011/0131949 A1 * | 6/2011 | Adams .................. F01N 3/0842 60/274 |
| 2011/0268634 A1 | 11/2011 | Linsenbuhler et al. |
| 2012/0308439 A1 | 12/2012 | Chen et al. |
| 2012/0328500 A1 | 12/2012 | Larcher et al. |
| 2013/0212944 A1 | 8/2013 | Stephenson et al. |
| 2014/0044629 A1 | 2/2014 | Bisson et al. |

(Continued)

FOREIGN PATENT DOCUMENTS

| EP | 0 980 707 A1 * | 2/2000 | ......... B01D 53/9422 |
| EP | 1924339 A1 * | 5/2008 | ......... B01D 53/9422 |

(Continued)

OTHER PUBLICATIONS

Zhao-shun Zhang et al, Appl. Cat. B: Environmental, vol. 165, (2015), pp. 232-244.
Li-Hong Guo et al, Catal. Today, Jun. 2017.
Applied Catalysis, 1991; Topics in Catalysis, Jul. 2004.
Cauqui, M. A.; Rodriguez-Izquierdo, J. M. J. Non-Cryst. Solids, 1992, 147/148, 724. (Sol-gel method).
Navio, et al., Chem. Mater. 1997, 9, 1256-1261. (Alkaline precipitation).
Kolenkoa, et al., Mater. Sci. Eng. C, 2003, 23, 1033 (Hydrothermal synthesis).
Kasilingam Boobalan, et al., J. Am. Ceram. Soc. 2010, 11, 3651-3656 (Combustion method).

(Continued)

Primary Examiner — Timothy C Vanoy
(74) Attorney, Agent, or Firm — Praedcere Law

(57) ABSTRACT

A passive $NO_X$ adsorbent includes: palladium, platinum or a mixture thereof and a mixed or composite oxide including the following elements in percentage by weight, expressed in terms of oxide: 10-90% by weight zirconium and 0.1-50% by weight of least one of the following: a transition metal or a lanthanide series element other than Ce.
Although the passive $NO_X$ adsorbent can include Ce in an amount ranging from 0.1 to 20% by weight expressed in terms of oxide, advantages are obtained particularly in the case of low-Ce or a substantially Ce-free passive NOx adsorbent.

19 Claims, No Drawings

(56) References Cited

U.S. PATENT DOCUMENTS

2017/0009623 A1\* 1/2017 Armitage ............. B01J 37/0246
2017/0241313 A1\* 8/2017 Wan ................... B01D 53/9418

FOREIGN PATENT DOCUMENTS

| EP | 2 783 741 A3 | \* | 12/2014 | ......... B01D 53/9418 |
| JP | 2000 079327 A | \* | 3/2000 | ......... B01D 53/9422 |
| JP | 2002 079 096 A | \* | 3/2002 | ......... B01D 53/9422 |
| MX | PA01010287 A | \* | 9/2002 | ......... B01D 53/9422 |
| WO | WO 2007 031627 A1 | \* | 3/2007 | ......... B01D 53/9422 |
| WO | WO2017/144493 A1 | | 8/2017 | |

\* cited by examiner

ZIRCONIA-BASED COMPOSITIONS FOR USE IN PASSIVE NOX ADSORBER DEVICES

TECHNICAL FIELD

This disclosure relates to treating gas streams so as to remove nitrogen oxides (NOx) therefrom and in particular, to passive NOx adsorbents (PNA) that store NOx at lower temperatures and then release the NOx at higher temperatures.

TECHNICAL BACKGROUND

Urea-SCR (Selective Catalytic Reduction) is a well-known solution for treating the NOx emissions from diesel engines, but requires the exhaust temperatures to be above 200° C. [1]. The heating rate on diesel engines/exhaust can be relatively slow, and this results in a delay between switching the engine on and being able to dose urea and effectively remove NOx by SCR ("cold-start" period). The NOx emissions during this cold start period comprise a large portion of the total emissions during the FTP-75 and NEDC test protocols for example, and this has significant implications for real world driving.

In Europe, the legislated NOx limits for diesel vehicles have been constantly falling since the introduction of the Euro standard, and the current Euro VI limit is 0.080 g/km (September 2014).

One solution is to utilize a "passive NOx adsorbent" (PNA) material upstream of the SCR catalyst, which is capable of storing NOx below 200° C. (i.e., during the cold start period) and then releasing it above this temperature (i.e., once the SCR catalyst is active).

Standard lean NOx trap materials (e.g., $Pt/Ba/Al_2O_3$) which require the oxidation of NO to $NO_2$ are useful at higher temperatures but do not tend to store NOx efficiently below 150° C. In this regard, an alternative class of materials are necessary that are more active at lower temperatures (from ambient up to 200° C.).

In addition to the low temperature NOx storage capability, PNA materials must also have suitable thermal stability. Depending on the location (e.g., on DOC), it may experience temperatures up to 800-850° C. (hydrothermal) under high engine load conditions. The PNA will always be upstream of the SCR catalyst but may be downstream of a filter, which could be regenerated actively or passively. Hence the PNA must maintain its low temperature activity after such thermal excursions.

Further to these thermal stability demands, candidate PNA materials should also be robust to the presence of sulfur-containing species in the exhaust gas. This implies that the materials have a relatively low propensity for adsorbing sulfur species, but also tend to de-sulfate under suitable conditions (e.g. preferably below 700° C. in lean conditions).

U.S. Pat. No. 8,105,559 refers to the use of palladium on ceria ($Pd—CeO_2$) as an effective PNA candidate. NOx is allegedly stored effectively at 120° C., 160° C. or 200° C., and is allegedly desorbed almost immediately upon ramping the temperature. However, no data is provided on the effect of sulfur in the feed gas.

U.S. Pat. No. 8,920,756 refers to the use of an $Ag/Al_2O_3$ component in combination with another material to create a passive NOx adsorber system. The second material may contain manganese, but only in combination with ceria, and this is likely to be inherently sulfur-intolerant. In addition to this, the function of the second component is to store NOx once the temperature is above 190° C. (NOx during the initial cold start period being stored on the $Ag/Al_2O_3$ component).

U.S. Pat. No. 9,687,811 discusses the use of various materials/combinations for use in the PNA application. Specific mention is made of manganese, but this is used/added as a bulk $Mn_3O_4$ component (i.e., not part of a solid solution) which is expected to lead to poor thermal stability and low sulfur-tolerance. Further to this, the $Mn_3O_4$ component is always added in combination with a ceria component.

Zhao-shun Zhang and co-workers (*Appl. Cat. B: Environmental*, 165 (2015) 232-244) investigated the addition of manganese into a model lean NOx trap ($Pd/Ba/Al_2O_3$). They demonstrated enhanced NO oxidation activity but required temperatures above 300° C. for efficient NOx storage.

Li-Hong Guo and co-workers (*Catal. Today*, June 2017) also investigated model manganese oxide systems under more relevant NOx storage conditions (i.e., <200° C.) and found that NOx could be stored effectively. However, although $MnO_2$ had the greatest NOx storage capacity, the strong adsorption of NOx meant that desorption was more difficult, and $Mn_2O_3$ showed more facile NOx release. So, when designing manganese-containing PNA materials, one should consider the state of the Mn species and the impact of other components of the mixed or composite oxide on this. Oxidation of NO to $NO_2$ is not always beneficial, with surface nitrites being generally less stable than nitrates, and thus more easily desorbed.

U.S. Patent application publication No. 2009/0191108 refers to the use of praseodymia-zirconia mixed oxides (optionally containing ceria) in NOx trapping applications for lean burning internal combustion engines. Although the materials showed improved sulfur-tolerance compared to $Ba/Al_2O_3$ reference (after rich regeneration at 550° C.), there is no low temperature activity promoting element (such as a transition metal) and these materials require temperatures of 200-300° C. for suitable NOx storage.

And finally, the palladium-on-zeolite system has received a lot of attention for the PNA application, such as U.S. published patent application No. 2012/0308439. Although efficient low temperature NOx storage is observed, the palladium usage can be quite high (>50 g/$ft^3$) which has cost implications, and these materials also tend to adsorb hydrocarbons which may or may not be advantageous.

SUMMARY OF THE DISCLOSURE

This disclosure features a composition for a passive NOx adsorbent comprising Zr-based mixed or composite-oxides. The passive NOx adsorbent includes at least one of the following: a transition metal (e.g., Mn, W, Fe) and a lanthanide series element (e.g., Pr). In some instances structural promoters, for example, an oxide of Y, La or Nd, may be used to improve the thermal durability of Zr-based mixed or composite-oxides [*Applied Catalysis*, 1991; *Topics in Catalysis*, July 2004].

The passive NOx adsorbents of this disclosure compensate for a deficiency in performance of conventional catalysts in removing NOx in gasoline and diesel engine exhaust from motor vehicles. The passive NOx adsorbents herein are able to store or adsorb NOx from the lean exhaust gas stream at lower temperatures (e.g., below 200° C.) at a point when conventional catalysts do not perform well. Then, above 200° C. the passive NOx adsorbents herein release or desorb the NOx at a point when the conventional catalysts can perform well. For example, the passive NOx adsorbent of the disclosure releases the NOx at temperatures above 200° C. to a downstream and different SCR catalyst device which reduces the NOx to nitrogen gas so as to satisfy stringent NOx emission regulations for motor vehicles.

A first aspect of this disclosure features a passive $NO_X$ adsorbent including: palladium, platinum or a mixture thereof and a mixed or composite oxide. The mixed or composite oxide includes the following composition: 10-90% by weight zirconium and 0.1-50% by weight of at least one of the following: a transition metal or a lanthanide series element other than Ce.

It should be appreciated that in the mixed or composite oxides of this disclosure, for example, the recited weight percentages of elements on an oxide basis are based on a total weight of the mixed or composite oxide and when combined equal 100%. Further, use of "comprising" transitional claim language does not exclude additional, unrecited elements or method steps. Moreover, the disclosure also contemplates use of "consisting essentially of" transitional claim language, which limits the scope of the claim to the specified materials or steps and those that do not materially affect the basic and novel characteristic(s) of the claimed invention which include the function of the mixed or composite oxide as a passive NOx adsorbent. When numerical ranges are used, the range includes the endpoints unless otherwise indicated.

Specific features of the first aspect of the disclosure will now be described. The mixed or composite oxide can include at least one of W, Mn and Fe as the transition metal. The transition metal(s) can be present in an amount ranging from 0.1% to 20% by weight of the mixed or composite oxide, on an oxide basis.

Particular mixed or composite oxides include the following: Pr—Zr; Mn—Zr; W—Zr; and Mn—Pr—Zr; any of the foregoing including Fe; and any of the foregoing including optional amounts of Ce or being substantially free of Ce as discussed further in the Summary of the Disclosure below.

In another feature, the mixed or composite oxide can include at least one of Pr, Tb, or a mixture of Pr and Tb, as the lanthanide series element other than Ce.

Yet another feature is that the mixed or composite oxide can include Pr as the lanthanide series element other than Ce, and at least one of the following metals selected from W, Mn, and Fe as the transition metal.

A further feature is that the mixed or composite oxide can include at least one of Y, La and Nd as the lanthanide series element other than Ce, present in an amount of up to 20% by weight, in particular, in an amount ranging from 0.5 to 20% by weight. In the case of rare earth elements including at least one of Y, La, Nd, when an amount greater than or equal to 0.5 wt % is recited, this indicates that the element(s) are intentionally added.

Another feature is that the mixed or composite oxide can include Pr and at least one of Y, La and Nd as the lanthanide series element other than Ce in an amount ranging from 0.5% to 20% by weight, and at least one of the following metals selected from W, Mn, and Fe as the transition metal in an amount ranging from 0.1% to 20% by weight.

A further feature is that the mixed or composite oxide can include an element from Group 14 of the Periodic Table (e.g., Si or Sn) in an amount ranging from 0.1 to 20% by weight expressed in terms of oxide.

Other features are that the mixed or composite oxide can include Mn as the transition metal in an amount of 0.1 to 20% by weight and Pr as the lanthanide series element other than Ce, in an amount of 0.5 to 30% by weight, the total amount of Mn and Pr being not more than 50% by weight.

The following specific features may apply to the above feature. In one feature, the mixed or composite oxide can further include at least one of W and Fe as the transition metal. In addition, the mixed or composite oxide can further include at least one of Y, La and Nd as the lanthanide series element other than Ce. Moreover, the mixed or composite oxide can include an element from Group 14 of the Period Table (e.g., Si or Sn) in an amount ranging from 0.1 to 20% by weight expressed in terms of oxide.

The mixed or composite oxide of the passive NOx adsorbent can include Ce in the following amounts: not more than 20% by weight expressed in terms of oxide; in particular, in an amount ranging from 0.1% to 20%; further ranging from 0.1 to less than 5%; further still ranging from 0.5 to less than 5%; and in particular, the passive NOx adsorbent can be substantially free of Ce.

The passive NOx adsorbent as a fresh material can have a minimum NOx storage capacity of 7.5 µmol/g after 5 minutes at 120° C.

Further, the passive NOx adsorbent as an aged material can have a minimum NOx storage capacity of 5 µmol/g after 5 minutes at 120° C.

Another feature is a passive NOx adsorbent according to the first aspect in which the mixed or composite oxide includes Mn as the at least one transition metal and includes optional element X, wherein when element X is present it is: at least one of Ce; or Pr as the lanthanide series element other than Ce, with a minimum fresh NOx storage capacity of at least 40 µmol/g after 5 minutes at 120° C.

Yet another feature is a passive NOx adsorbent according to the first aspect in which the mixed or composite oxide includes Mn as the at least one transition metal and optional element X, wherein when element X is present it is: at least one of Ce; or Pr as the lanthanide series element other than Ce, with a minimum aged NOx storage capacity of at least 19 µmol/g after 5 minutes at 120° C.

Another feature is a passive NOx adsorbent according to the first aspect in which the mixed or composite oxide includes Mn as the at least one transition metal and Pr as the lanthanide series element other than Ce, with a minimum fresh NOx storage capacity of at least 50 µmol/g after 5 minutes at 120° C.

Still further is featured a passive NOx adsorbent according to the first aspect in which the mixed or composite oxide includes Mn as the at least one transition metal and Pr as the lanthanide series element other than Ce, with a minimum aged NOx storage capacity of at least 45 µmol/g after 5 minutes at 120° C.

Another feature is a monolithic substrate supporting a washcoat, the washcoat comprising the passive NOx adsorbent of the first aspect of the disclosure.

Further the passive NOx adsorbent of the first aspect of the disclosure can be used in combination with a Selective Catalytic Reduction catalyst.

A second aspect of the disclosure features a method for reducing nitrogen oxides (NOx) present in a lean gas stream including at least one of nitric oxide (NO) and nitrogen dioxide ($NO_2$), including the following steps. The passive NOx adsorbent of the first aspect of the disclosure is provided in the lean gas stream. NOx is adsorbed from the lean gas stream on or in the passive NOx adsorbent at a temperature below 200° C. $NO_X$ is thermally net desorbed from the passive NOx adsorbent in the lean gas stream at 200° C. and above. The $NO_X$ is catalytically reduced on a downstream catalyst situated downstream of the passive NO$_X$ adsorbent, with at least one of the following reductants: a nitrogenous reductant, a hydrocarbon reductant, hydrogen and a mixture thereof.

In one specific feature of the second aspect the lean gas stream emanates from a gasoline fueled or diesel fueled engine.

Many additional features, advantages and a fuller understanding of the disclosure will be had from the Detailed Description that follows. It should be understood that the above Summary of the Disclosure describes the subject matter of the disclosure in broad terms while the following Detailed Description describes the subject matter of the disclosure more narrowly and presents particular embodiments that should not be construed as necessary limitations of the broad subject matter of the disclosure.

DETAILED DESCRIPTION

Fresh Mn-zirconia passive NOx adsorbents and Mn—Pr-zirconia passive NOx adsorbents exhibit NO$_X$ storage values after, for example, 5 minutes at 120° C. comparable to those of analogous fresh materials containing Ce but drop off after 15 minutes at 120° C. As known in the art, aging represents expected behavior of a material after being in use for a period of time. Looking at aged PNA materials, the Mn—Pr-zirconia passive NOx adsorbent compositions of this disclosure exhibit NO$_X$ storage values after all times up to 15 minutes at 120° C. comparable or considerably greater than those of the Ce-containing analogues.

The term "passive NOx adsorbent (PNA)" as used in this disclosure means an adsorbent disposed in a gas stream, which stores NOx from the gas stream at temperatures up to 200° C. and releases the stored NOx into the gas stream at temperatures greater than 200° C. If an SCR catalyst is used, the PNA can be located upstream of the SCR catalyst, for example. When the term "fresh" is used in this disclosure it means an adsorbent material that has only been calcined under such conditions as to decompose any precursor constituents into an "active" form, and hasn't undergone any accelerated and/or in-use ageing.

Tungstated zirconia ($WO_3$—$ZrO_2$) passive NOx adsorbent material has also been shown to exhibit considerably greater NO$_X$ storage values compared to pure zirconia (in the presence of Pt or Pd, and tested fresh).

Equally important for passive NOx adsorbents, the stored NO$_X$ can be thermally desorbed from the adsorbent with high efficiency in the working temperature range of 200-350° C. The tungstated zirconia adsorbent discussed above has also been shown to exhibit a greater percentage of the amount of NO$_X$ desorbed to the amount stored compared to other materials presented here. Similarly, the addition of Pr to Mn-zirconia adsorbent has been shown to be beneficial in terms of facilitating thermal NO$_X$ release between 200 and 250° C. compared to non-Pr containing and Ce-containing analogues.

Therefore, comparable properties and even definite advantages are obtained in the passive NOx adsorbents of this disclosure when avoiding use of Ce, compared to Ce containing compositions. The passive NOx adsorbents of this disclosure advantageously can limit Ce to the following amounts on an oxide basis: Ce in an amount not more than 20% by weight; Ce in an amount ranging from 0.1 to 20% by weight; Ce in an amount less than 5% by weight; Ce ranging from 0.5% to less than 5% by weight; and in particular, the composition is substantially free of Ce.

While the addition of Fe to Ce-zirconia passive NOx adsorbent material provides for less overall NO$_X$ storage compared to a Mn—Ce-zirconia passive NOx adsorbent material, the Fe-containing adsorbent material exhibits a greater percentage of the amount of NO$_X$ desorbed to the amount stored. By extrapolation, it is believed this desorbing behavior resulting from use of Fe would also be evident in non-ceria containing passive NOx adsorbent material or low-ceria containing passive NOx adsorbent material.

The mixed or composite oxide compositions of the passive NOx adsorbents of this disclosure may include the listed elements as oxides. However, a portion of the elements may be in a form of hydroxides or oxyhydroxides. The passive NOx adsorbents can be in the form of a powder. Typical characteristics of the PNA powder include: particle size; $d_{50}$ may range from about 1 μm to about 100 μm, although for washcoated materials the $d_{50}$ will generally be <10 μm. The surface area of the fresh PNA powder will typically fall in the range 40-250 $m^2/g$. The total pore volume of the fresh PNA powder will typically fall in the range 0.10-1.0 $cm^3/g$. Impurity levels of the fresh PNA powder are <500 ppm of Na or Cl and <0.1% $SO_4$ typical impurities. Naturally occurring $HfO_2$ may be present in an amount of 1-2% in the $ZrO_2$ used in the adsorbents of this disclosure. The PNA powder may be applied as an aqueous washcoat that coats a substrate, for example, onto a monolithic substrate, and in particular, onto a honeycomb shaped monolithic substrate. Examples of monolith coating methods suitable for use in this disclosure can be found in US2011/0268634A1 and WO2017/144493A1, which are incorporated herein by reference in their entireties, although other techniques could be used.

The passive NOx adsorbents of this disclosure may be used in various gas streams containing NOx and, in particular, in lean gas streams. An example lean gas stream includes the following components in the indicated percentages by volume: $CO_2$ about 12%, $H_2O$ about 11%, $O_2$ about 9%, NOx 50-1000 ppm, CO 100-500 ppm, PM 1-30 $mg/m^3$, HC 20-300 ppm. One particular application is in an exhaust stream of a gasoline fueled engine of a motor vehicle. Another application is in the exhaust stream of a diesel fueled engine of a motor vehicle. Non-automotive applications such as trains and ships are also relevant with regard to use of the materials of this disclosure, along with stationary emissions sources such as power stations, refineries, and general industrial facilities that generate NOx.

Given that interest in this type of automotive application is growing (in an effort to decrease cold start emissions from lean-burn engines), the commercial application of these devices can be expected in the near future.

Suitable methods for preparing the passive NOx adsorbents of this disclosure may include (but are not limited to) the methods described in the following references, all of which are incorporated herein by reference in their entireties:

1. Cauqui, M. A.; Rodriguez-Izquierdo, J. M. *J. Non-Cryst. Solids,* 1992, 147/148, 724. (Sol-gel method);
2. J. A. Navio, et al., *Chem. Mater.* 1997, 9, 1256-1261. (Alkaline precipitation);
3. Kolen'koa Y., et al., *Mater. Sci. Eng. C,* 2003, 23, 1033 (Hydrothermal synthesis);
4. Kasilingam Boobalan, et al., *J. Am. Ceram. Soc.* 2010, 11, 3651-3656 (Combustion method);
5. U.S. Pat. No. 7,431,910;
6. U.S. Pat. No. 7,632,477;
7. U.S. Pat. No. 7,794,687.

The subject matter of the disclosure will now be described by reference to the following examples, which are for purposes of illustration and should not necessarily be used to limit the subject matter herein.

Example 1

A portion of tungstated zirconia mixed or composite oxide (15.75% $WO_3$/84.25% $ZrO_2$) (e.g., can be made using the process described in U.S. Pat. No. 7,632,477) was used as a support to make the "Pt—W—Zr" and "Pd—W—Zr" materials. All amounts of compounds in this disclosure are in % by weight that together equal 100% of the composition, unless otherwise indicated. It is assumed the zirconia includes an amount of $HfO_2$ up to 2% even if this is not indicated.

Pt and Pd were deposited on the support by means of incipient wetness impregnation. The support material was first dried in a vacuum oven at 70° C. overnight then impregnated with an aqueous solution of tetra-amine platinum (II) nitrate (or tetra-amine palladium nitrate). Pt and Pd loadings were kept at 1 wt % for single metal catalysts, the remainder being the mixed or composite oxide. If bimetallic catalysts are used, Pt and Pd can be simultaneously loaded on the support by co-impregnation using a mixture of Pt and Pd tetra-amine nitrate solution. For bimetallic catalysts, Pt and Pd loadings can be 0.5 wt % for each metal, the remainder being the mixed or composite oxide. After drying at 50° C. overnight in a vacuum oven, the impregnated samples were calcined at 500° C. for 3 h.

For some of the Examples and Comparative Example, fresh and aged PNA powders had characteristics recited in Table 3 below.

A microreactor loaded with about 150 mg of PNA powder (free flowing powder, having a particle size of less than 0.2 mm) was employed to study the $NO_X$ adsorption and desorption properties of the adsorbents. In all the cases, a total flow rate of 120 sccm was used, corresponding to a gas hourly space velocity (GHSV) of about 30,000 $h^{-1}$.

Effluent gases were analyzed using a mass spectrometer (QMS 200). Unless otherwise stated, the adsorbents were first pretreated at the desired $NO_X$ storage temperature under lean gas containing 5% $O_2$, 5% $CO_2$ and 3.5% $H_2O$ until the samples were saturated (based on a comparison of the feed and effluent gas concentrations); typically this required 15 minutes.

$NO_X$ storage was performed at three different temperatures (80, 100 and 120° C.) by adding 300 ppm NO to the lean feed gas. After $NO_X$ storage for a specified period of time, the feed gas was switched to bypass mode and the NO flow was switched off.

When the NO concentration had dropped to zero, the gas was re-directed to the reactor and temperature-programmed desorption was carried out to study $NO_X$ desorption behavior using a ramp rate of 10° C./min from the storage temperature up to 500° C. The results are presented in Table 1.

Comparative Example 1

A portion of undoped zirconia (e.g., can be made using the process described in U.S. Pat. No. 7,794,687) was used as a support to make the "Pt—Zr" and "Pd—Zr" materials and then tested based on the procedures detailed in EXAMPLE 1. The results are presented in Table 1.

Example 2

A portion of undoped zirconia (same material as used in COMPARATIVE EXAMPLE 1) was first impregnated with an aqueous solution of manganese nitrate, then dried and calcined at 500° C. for 3 h. The resulting Mn—$ZrO_2$ oxide (20.0% $MnO_2$/80.0% $ZrO_2$) was subsequently impregnated with aqueous tetra-amine palladium (II) nitrate and further calcined at 500° C. for 3 h. Pd loading in the catalysts was maintained at 1 wt %.

The material of EXAMPLE 2 was then tested based on the procedures detailed in EXAMPLE 1. The results are presented in Table 1.

Example 3

A portion of a ceria-zirconia mixed or composite oxide (25.7% $CeO_2$/74.3% $ZrO_2$) (e.g., can be made using the process described in U.S. Pat. No. 7,431,910) was first impregnated with an aqueous solution of manganese nitrate, then dried and calcined at 500° C. for 3 h. The resulting Mn—Ce—$ZrO_2$ oxide (20.0% $MnO_2$/20.6% $CeO_2$/59.4% $ZrO_2$) was subsequently impregnated with aqueous tetra-amine palladium (II) nitrate and further calcined at 500° C. for 3 h. Pd loading in the catalysts was maintained at 1 wt %.

The material of EXAMPLE 3 was then tested based on the procedures detailed in EXAMPLE 1. The results are presented in Table 1.

Example 4

A portion of manganese-zirconia mixed or composite oxide (13.3% $MnO_2$/86.7% $ZrO_2$) was used as a support for palladium and tested based on the procedures detailed in EXAMPLE 1.

This mixed or composite oxide can be made using the process described in U.S. Pat. No. 7,632,477, which is incorporated herein by reference in its entirety. The results are presented in Table 1.

Example 5

A portion of EXAMPLE 4 (with palladium added) was hydrothermally aged and then tested based on the procedures detailed in EXAMPLE 1. All hydrothermal ageing carried out in this disclosure is under the conditions of 750° C. for 16 hours in 10% $O_2$, 5% $CO_2$, 5% $H_2O$, balance $N_2$ gas. The results are presented in Table 1.

Example 6

A portion of a manganese-praseodymia-zirconia mixed or composite oxide (14.3% $MnO_2$/14.0% $Pr_6O_{11}$/71.7% $ZrO_2$) was used as a support for palladium and then tested based on the procedures detailed in EXAMPLE 1.

This mixed or composite oxide can be made using the process described in U.S. Pat. No. 7,632,477. The results are presented in Table 1.

Example 7

A portion of a manganese-ceria-zirconia mixed or composite oxide (13.0% $MnO_2$/10.0% $CeO_2$/77.0% $ZrO_2$) was used as a support for palladium and then tested based on the procedures detailed in EXAMPLE 1. The results are presented in Table 1.

This mixed or composite oxide can be made using the process described in U.S. Pat. No. 7,431,910.

Example 8

A portion of a manganese-praseodymia-zirconia mixed or composite oxide (7.0% $MnO_2$/13.6% $Pr_6O_{11}$/79.4% $ZrO_2$)

was used as a support for palladium and then tested based on the procedures detailed in EXAMPLE 1.

This mixed or composite oxide can be made using the process described in U.S. Pat. No. 7,632,477. The results are presented in Table 1.

Example 9

A portion of EXAMPLE 8 (with palladium added) was hydrothermally aged and then tested based on the procedures detailed in EXAMPLE 1. The results are presented in Table 1.

Example 10

A portion of a manganese-ceria-zirconia mixed or composite oxide (6.3% $MnO_2$/9.7% $CeO_2$/84.0% $ZrO_2$) was used as a support for palladium and then tested based on the procedures detailed in EXAMPLE 1.

This mixed or composite oxide can be made using the process described in U.S. Pat. No. 7,431,910. The results are presented in Table 1.

Example 11

A portion of EXAMPLE 10 (with palladium added) was hydrothermally aged and then tested based on the procedures detailed in EXAMPLE 1. The results are presented in Table 1.

Example 12

A portion of a manganese-ceria-zirconia mixed or composite oxide (20.0% $MnO_2$/10.0% $CeO_2$/70.0% $ZrO_2$) was used as a support for palladium and then tested based on the procedures detailed in EXAMPLE 1.

This mixed or composite oxide can be made using the process described in U.S. Pat. No. 7,431,910. The results are presented in Table 1.

Example 13

A portion of EXAMPLE 12 (with palladium added) was hydrothermally aged and then tested based on the procedures detailed in EXAMPLE 1. The results are presented in Table 1.

Example 14

A portion of an iron-ceria-zirconia mixed or composite oxide (20.0% $Fe_2O_3$/10.0% $CeO_2$/70.0% $ZrO_2$) was used as a support for palladium and then tested based on the procedures detailed in EXAMPLE 1.

This mixed or composite oxide can be made using the process described in U.S. Pat. No. 7,431,910. The results are presented in Table 1.

Example 15

A portion of an iron-ceria-zirconia mixed or composite oxide (10.0% $Fe_2O_3$/10.0% $CeO_2$/80.0% $ZrO_2$) was used as a support for palladium and then tested based on the procedures detailed in EXAMPLE 1.

This mixed or composite oxide can be made using the process described in U.S. Pat. No. 7,431,910. The results are presented in Table 1.

Example 16

A portion of an iron-ceria-zirconia mixed or composite oxide (5.0% $Fe_2O_3$/10.0% $CeO_2$/85.0% $ZrO_2$) was used as a support for palladium and then tested based on the procedures detailed in EXAMPLE 1.

This mixed or composite oxide can be made using the process described in U.S. Pat. No. 7,431,910. The results are presented in Table 1.

Example 17

A manganese-silica-praseodymia-zirconia mixed or composite oxide was prepared (7.0% $MnO_2$/13.6% $Pr_6O_{11}$ 5.0% $SiO_2$/74.4% $ZrO_2$); analogous to EXAMPLE 8 but with silica present.

This mixed or composite oxide can be made using the process described in U.S. Pat. No. 7,632,477.

Conclusions:

Conclusions drawn from the test results described in the discussed in EXAMPLES 1-16 and COMPARATIVE EXAMPLE 1 are shown in Table 1 and discussed below. In the discussion, amounts of the elements in the mixed or composite oxides are rounded to the nearest whole number.

TABLE 1

Results of testing the Indicated PNA materials for a storage temperature of 120° C. and a desorption time of 15 minutes.

| Material | Amount $NO_X$ Stored at 120° C. (µmol/g) | | | | Amount $NO_X$ Desorbed (µmol/g) | | % of Amount Desorbed to Amount Stored |
|---|---|---|---|---|---|---|---|
| | 1 min | 2 min | 5 min | 15 min | 15 min <250° C. | 15 min <350° C. | 15 min <350° C./15 min |
| Comparative Example 1 (Pt) | 4.97 | 9.71 | 14.62 | 29.42 | 7.56 | 11.09 | 38 |
| Comparative Example 1 (Pd) | 3.59 | 5.62 | 10.73 | 23.45 | 8.91 | 16.81 | 72 |
| Example 1 (Pt) | 3.67 | 5.01 | 7.77 | 12.99 | 7.26 | 10.30 | 79 |
| Example 1 (Pd) | 9.42 | 15.76 | 24.19 | 30.65 | 24.88 | 29.35 | 96 |
| Example 2 (Pd) | 10.69 | 21.10 | 45.73 | 80.06 | 32.80 | 64.61 | 81 |
| Example 3 (Pd) | 10.19 | 19.19 | 43.59 | 92.47 | 23.23 | 55.91 | 60 |
| Example 12 (Pd) | 11.10 | 21.47 | 53.78 | 145.78 | 30.32 | 102.70 | 70 |
| Example 13 (Pd) | 10.41 | 18.23 | 27.30 | 34.42 | 15.15 | 23.71 | 69 |
| Example 4 (Pd) | 10.96 | 21.65 | 53.64 | 126.87 | 45.73 | 111.67 | 88 |

TABLE 1-continued

Results of testing the Indicated PNA materials for a storage temperature of 120° C. and a desorption time of 15 minutes.

| Material | Amount $NO_X$ Stored at 120° C. (µmol/g) | | | | Amount $NO_X$ Desorbed (µmol/g) | | % of Amount Desorbed to Amount Stored |
|---|---|---|---|---|---|---|---|
| | 1 min | 2 min | 5 min | 15 min | 15 min <250° C. | 15 min <350° C. | 15 min <350° C./15 min |
| Example 5 (Pd) | 9.61 | 13.87 | 20.10 | 31.88 | 14.86 | 19.96 | 63 |
| Example 7 (Pd) | 10.78 | 21.24 | 53.55 | 136.66 | 34.44 | 100.70 | 74 |
| Example 6 (Pd) | 10.70 | 21.35 | 53.34 | 113.94 | 36.72 | 75.04 | 66 |
| Example 8 (Pd) | 10.68 | 21.33 | 52.88 | 118.95 | 36.33 | 58.74 | 49 |
| Example 9 (Pd) | 10.47 | 20.62 | 46.53 | 69.91 | 16.26 | 48.41 | 69 |
| Example 10 (Pd) | 10.76 | 21.43 | 53.63 | 114.76 | 41.26 | 75.03 | 65 |
| Example 11 (Pd) | 10.62 | 20.30 | 31.95 | 37.69 | 22.81 | 36.23 | 96 |
| Example 14 (Pd) | 2.79 | 4.87 | 10.55 | 25.59 | 12.86 | 22.77 | 89 |
| Example 15 (Pd) | 2.99 | 5.30 | 11.22 | 27.75 | 13.53 | 24.11 | 87 |
| Example 16 (Pd) | 2.99 | 5.11 | 10.79 | 26.62 | 16.58 | 27.83 | 100 |

Example 1 (Pd)

The Pd—W—Zr material exhibits greater $NO_X$ storage at 120° C. at all times explored compared to the Pd—Zr material (see COMPARATIVE EXAMPLE 1 (Pd)) and greater percentage of the amount $NO_X$ desorbed to the amount stored. In particular, the Pd—W—Zr material exhibits an amount of $NO_X$ desorbed to the amount stored of 96%.

Example 2 (Pd)

The Pd—Mn(20)-Zr material exhibits $NO_X$ storage values after 5 minutes at 120° C. comparable to those of the Pd—Mn(20)-Ce(21)-Zr material (see EXAMPLE 3 (Pd)) but less storage after 15 minutes at 120° C. However, the Pd—Mn(20)-Zr material exhibits considerably better $NO_X$ desorption at all temperatures explored relative to the amount stored, compared to the Pd—Mn(20)-Ce(21)-Zr material. This illustrates a definite advantage over materials that include Ce, for use as passive NOx adsorbents.

Example 4 (Pd)

The Pd—Mn(13)-Zr material exhibits $NO_X$ storage values after 5 minutes at 120° C. comparable to those of the Pd—Mn(13)-Ce(10)-Zr material (see EXAMPLE 7 (Pd)) but less storage after 15 minutes at 120° C. However, the Pd—Mn(13)-Zr material exhibits a greater percentage of the amount $NO_X$ desorbed to the amount stored. This shows a definite advantage over Ce containing adsorbent material.

Example 6 (Pd)

The Pd—Mn(14)-Pr(14)-Zr material exhibits $NO_X$ storage values after 5 minutes at 120° C. comparable to those of the Pd—Mn(13)-Ce(10)-Zr material (see EXAMPLE 7 (Pd)).

Example 8 (Pd)

The Pd—Mn(7)-Pr(14)-Zr material exhibits $NO_X$ storage values after 5 minutes at 120° C. comparable to that of the Pd—Mn(6)-Ce(10)-Zr material (see EXAMPLE 10 (Pd)).

Example 9 (Pd)

The Pd—Mn(7)-Pr(14)-Zr (HT aged) material exhibits comparable or better $NO_X$ storage values at 120° C. at all times explored with respect to the Pd—Mn(6)-Ce(10)-Zr (HT aged) material (see EXAMPLE 11 (Pd)). In particular, the Pd—Mn(7)-Pr(14)-Zr (HT aged) material of Example 9 (Pd) exhibited the greatest amount of NOx storage of all the aged materials explored in these EXAMPLES and COMPARATIVE EXAMPLES at about 70 µmol/g.

Example 14 (Pd)

While the Pd—Fe(20)-Ce(10)-Zr material exhibits less $NO_X$ storage compared to a Pd—Mn—Ce-zirconia material (e.g. see EXAMPLE 12 (Pd)), the Pd—Fe(20)-Ce(10)-Zr material exhibits a large percentage of the amount of $NO_X$ desorbed to the amount stored. By extrapolation, this behavior resulting from use of Fe would also be evident in non-ceria containing materials.

Example 15 (Pd)

While the Pd—Fe(10)-Ce(10)-Zr material exhibits less $NO_X$ storage compared to a typical Pd—Mn—Ce-zirconia material (e.g. see EXAMPLE 7 (Pd)), the Pd—Fe(10)-Ce (10)-Zr material exhibits a large percentage of the amount $NO_X$ desorbed to the amount stored.

By extrapolation, this behavior resulting from use of Fe would also be evident in non-ceria containing materials.

Example 16 (Pd)

While the Pd—Fe(5)-Ce(10)-Zr material exhibits less $NO_X$ storage compared to a Pd—Mn—Ce-zirconia material (e.g. see EXAMPLE 10 (Pd)), the Pd—Fe(5)-Ce(10)-Zr material exhibits a large percentage of the amount $NO_X$ desorbed to the amount stored. By extrapolation, this behavior resulting from use of Fe would also be evident in non-ceria containing materials.

The disclosure now turns to further examples and a comparative example for illustrating the subject matter of the disclosure, which should not be used to necessarily limit the subject matter herein.

Example 18

A portion of a praseodymia-zirconia mixed or composite oxide (25.5% $Pr_6O_{11}$/74.5% $ZrO_2$) was used as a support for palladium and then tested based on the procedures detailed in EXAMPLE 1.

This mixed or composite oxide can be made using the process described in U.S. Pat. No. 7,632,477. The results are presented in Table 2 below.

Example 19

A portion of a ceria-praseodymia-zirconia mixed or composite oxide (20.6% $CeO_2$/5.1% $Pr_6O_{11}$/74.3% $ZrO_2$) was used as a support for palladium and then tested based on the procedures detailed in EXAMPLE 1.

This mixed or composite oxide can be made using the process described in U.S. Pat. No. 7,431,910. The results are presented in Table 2 below.

Comparative Example 2

A portion of a high ceria-praseodymia-zirconia mixed or composite oxide (67.9% $CeO_2$/16.8% $Pr_6O_{11}$/15.3% $ZrO_2$) obtained from MEL Chemicals was used as a support for palladium and then tested based on the procedures detailed in EXAMPLE 1.

This mixed or composite oxide can be made using the process described in Applicant's U.S. Pat. No. 7,431,910. The results are presented in Table 2 below.

CONCLUSIONS

Conclusions drawn from the test results described in Examples 18 and 19 and Comparative Example 2 are shown in Table 2 and discussed below.

TABLE 2

Results of testing the PNA materials for a storage temperature 120° C. and a desorption time of 5 minutes.

| | Amount $NO_X$ Stored at 120° C. (μmol/g) | | | Amount $NO_X$ Desorbed (μmol/g) | |
|---|---|---|---|---|---|
| Material | 1 min | 2 min | 5 min | 5 min-<250° C. | 5 min-<350° C. |
| Example 18 (Pd) | 5.02 | 8.35 | 16.78 | 8.63 | 13.24 |
| Example 19 (Pd) | 4.99 | 8.03 | 15.68 | 5.18 | 10.15 |
| Comparative Example 2 (Pd) | 5.67 | 10.18 | 20.65 | 5.85 | 7.15 |

While the praseodymia-zirconia mixed or composite oxide of Example 18 and the ceria-praseodymia-zirconia mixed or composite oxide of Example 19 did not have high storage of NOx after 5 minutes at 120° C. minutes compared to other materials tested, they exhibited a relatively high amount of NOx desorbed. Although the high ceria-praseodymia-zirconia mixed or composite oxide of Comparative Example 2 exhibited slightly better storage of NOx after 5 minutes at 120° C. compared to the adsorbents of Examples 18 and 19, this is for a significant increase in ceria/praseodymia level (and therefore expense) and it exhibited only a comparable or a lesser amount of NOx desorbed at the temperatures tested (a significant facet of the PNA function).

Table 3 below shows Surface area, total pore volume and crystallite size for fresh and aged PNA material of the indicated EXAMPLES and COMPARATIVE EXAMPLES.

TABLE 3

Characteristics of Fresh and Aged PNA materials of the Indicated EXAMPLES and COMPARATIVE EXAMPLES.

| | Fresh | | | Air Aged (900° C./2 hr) | | | Hydrothermally aged (750° C./16 hr) | |
|---|---|---|---|---|---|---|---|---|
| | SA (m2/g) | TPV (cm3/g) | CS (nm) | SA (m2/g) | TPV (cm3/g) | CS (nm) | SA (m2/g) | TPV (cm3/g) |
| COMP. EXAMPLE 1 | 84 | 0.35 | | | | | | |
| EXAMPLE 1 | | | | | | | | |
| EXAMPLE 3 | | | | | | | | |
| EXAMPLE 4 | 149 | 0.41 | 8.2 | 7 | 0.03 | | | |
| EXAMPLE 5 | — | | | | | | | |
| EXAMPLE 6 | 153 | 0.40 | 4.2 | 25 | 0.11 | 16 | | |
| EXAMPLE 7 | 146 | 0.41 | 8.3 | 11 | 0.05 | 27 | | |
| EXAMPLE 8 | 95 | 0.45 | 11 | 27 | 0.12 | 16 | | |
| EXAMPLE 9 | — | | | | | | 48 | 0.24 |
| EXAMPLE 10 | 98 | 0.39 | 9.6 | 13 | 0.07 | 26 | | |
| EXAMPLE 11 | — | | | | | | | |
| EXAMPLE 12 | 103 | 0.30 | | | | | | |
| EXAMPLE 13 | — | | | | | | 21 | 0.10 |
| EXAMPLE 14 | 80 | | | | | | | |
| EXAMPLE 15 | 67 | | | | | | | |
| EXAMPLE 16 | 62 | | | | | | | |
| EXAMPLE 17 | 150 | 0.63 | 6.3 | 46 | 0.26 | 11 | | |
| EXAMPLE 18 | 80 | 0.36 | 12 | | | | | |
| EXAMPLE 19 | 82 | 0.34 | 7.9 | | | | | |
| COMPARATIVE EXAMPLE 2 | 94 | 0.24 | 7.1 | | | | | |

SA = Surface Area
TPV = Total Pore Volume
CS = Crystallite Size (from XRD)

Many modifications and variations of the subject matter of the disclosure will be apparent to those of ordinary skill in the art. Therefore, it is to be understood that the subject matter of the disclosure can be practiced otherwise than has been specifically shown and described.

What is claimed is:

1. A passive $NO_X$ adsorbent comprising: palladium, platinum or a mixture thereof and a mixed or composite oxide comprising the following elements in percentage by weight, expressed in terms of oxide: 10-90% by weight zirconium; and 0.1-50% by weight of least one of the following: a lanthanide series element other than Ce, comprising Pr; and a transition metal comprising at least one of the following metals selected from W, Mn, and Fe.

2. A passive NOx adsorbent according to claim 1 further comprising at least one of Y, La and Nd as said lanthanide series element other than Ce.

3. A passive NOx adsorbent according to claim 1, comprising Mn as said transition metal in an amount of 0.1 to 20% by weight and Pr as said lanthanide series element other than Ce in an amount of 0.5 to 30% by weight, wherein a total amount of Pr and Mn is not more than 50% by weight.

4. A passive NOx adsorbent according to claim 3 further comprising at least one of W and Fe as said transition metal.

5. A passive NOx adsorbent according to claim 3 further including at least one of Y, La and Nd as said lanthanide series element other than Ce.

6. A passive NOx adsorbent according to claim 3 further comprising an element from Group 14 of the Periodic Table in an amount ranging from 0.1 to 20% by weight expressed in terms of oxide.

7. A passive NOx adsorbent according to claim 1 comprising Ce in an amount ranging from 0.1% to not more than 20% by weight expressed in terms of oxide.

8. A passive NOx adsorbent according to claim 1 comprising Ce in an amount ranging from 0.5 to not more than 5% by weight expressed in terms of oxide.

9. A passive NOx adsorbent according to claim 1 with the proviso that the passive NOx adsorbent is substantially free of Ce.

10. A passive NOx adsorbent according to claim 1 with a minimum fresh NOx storage capacity of 7.5 µmol/g after 5 minutes at 120° C.

11. A passive NOx adsorbent according to claim 1 with a minimum aged NOx storage capacity of 5 µmol/g after 5 minutes at 120° C.

12. A passive NOx adsorbent according to claim 1 in which the mixed or composite oxide includes Mn as said at least one transition metal and optional Ce, with a minimum fresh NOx storage capacity of at least 40 µmol/g after 5 minutes at 120° C.

13. A passive NOx adsorbent according to claim 1 in which the mixed or composite oxide includes Mn as said at least one transition metal and optional Ce, with a minimum aged NOx storage capacity of at least 19 µmol/g after 5 minutes at 120° C.

14. A passive NOx adsorbent according to claim 1 in which the mixed or composite oxide includes Mn as said at least one transition metal, with a minimum fresh NOx storage capacity of at least 50 µmol/g after 5 minutes at 120° C.

15. A passive NOx adsorbent according to claim 1 in which the mixed or composite oxide includes Mn as said at least one transition metal, with a minimum aged NOx storage capacity of at least 45 µmol/g after 5 minutes at 120° C.

16. A passive NOx adsorbent according to claim 1 in combination with a Selective Catalytic Reduction catalyst.

17. A monolithic substrate supporting a washcoat, said washcoat comprising said passive NOx adsorbent according to claim 1.

18. A method for reducing nitrogen oxides (NOx) present in a lean gas stream comprising at least one of nitric oxide (NO) and nitrogen dioxide ($NO_2$), comprising the steps of:
   (i) providing the passive NOx adsorbent according to claim 1 in the lean gas stream;
   (ii) adsorbing NOx from the lean gas stream on or in the passive NOx adsorbent at a temperature below 200° C.;
   (iii) thermally net desorbing $NO_X$ from the passive NOx adsorbent in the lean gas stream at 200° C. and above;
   (iv) catalytically reducing the $NO_X$ on a downstream catalyst situated downstream of the passive $NO_X$ adsorbent, with at least one of the following reductants: a nitrogenous reductant, a hydrocarbon reductant, hydrogen and a mixture thereof.

19. A method according to claim 18 wherein the lean gas stream emanates from a gasoline fueled or diesel fueled engine.

* * * * *